US012594999B2

(12) United States Patent
Kim et al.

(10) Patent No.: US 12,594,999 B2
(45) Date of Patent: Apr. 7, 2026

(54) SIDE SILL BRACKET AND SIDE SILL ASSEMBLY FOR VEHICLE INCLUDING THE SAME

(71) Applicants: Hyundai Motor Company, Seoul (KR); Kia Corporation, Seoul (KR)

(72) Inventors: Byung-Jo Kim, Gwangmyeong-Si (KR); Seung-Gu Kim, Incheon (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 342 days.

(21) Appl. No.: 18/235,265

(22) Filed: Aug. 17, 2023

(65) Prior Publication Data

US 2024/0286684 A1 Aug. 29, 2024

(30) Foreign Application Priority Data

Feb. 28, 2023 (KR) ........................ 10-2023-0027049

(51) Int. Cl.
| | |
|---|---|
| *B62D 25/02* | (2006.01) |
| *B62D 21/15* | (2006.01) |
| *B62D 29/00* | (2006.01) |
| *B62D 27/02* | (2006.01) |
| *B62D 27/06* | (2006.01) |

(52) U.S. Cl.
CPC ......... *B62D 25/025* (2013.01); *B62D 21/157* (2013.01); *B62D 29/002* (2013.01); *B62D 27/023* (2013.01); *B62D 27/065* (2013.01)

(58) Field of Classification Search
CPC ...... B62D 25/025; B62D 25/04; B62D 25/02; B62D 21/157; B62D 27/023; B62D 27/065; B62D 27/026; B62D 29/02; B60Y 2306/01
USPC ..... 296/197.12, 209, 29, 30, 193.06, 187.12
See application file for complete search history.

(56) References Cited

FOREIGN PATENT DOCUMENTS

| | | | | | |
|---|---|---|---|---|---|
| JP | 2000318653 | A | * 11/2000 | ........... | B62D 25/025 |
| JP | 4488461 | B2 | * 6/2010 | ............. | B62D 25/04 |
| KR | 20-1997-0051616 | U | 9/1997 | | |

OTHER PUBLICATIONS

JP2000318653 Text (Year: 2000).*
JP4488461 Text (Year: 2010).*

* cited by examiner

*Primary Examiner* — Dennis H Pedder
(74) *Attorney, Agent, or Firm* — MORGAN, LEWIS & BOCKIUS LLP

(57) ABSTRACT

A side sill assembly for a vehicle includes a side sill inner, a side sill outer including an upper end portion and a lower end portion connected to the side sill inner, and a reinforcement member disposed between the side sill internal and the side sill outer in a longitudinal direction of the vehicle and fastened to the side sill internal further includes a side sill bracket mounted between the side sill outer and the reinforcement member and configured to support the side sill outer and the reinforcement member between the side sill outer and the reinforcement member to improve a stiffness against a side collision.

18 Claims, 8 Drawing Sheets

SIDE SILL BRACKET AND SIDE SILL ASSEMBLY FOR VEHICLE INCLUDING THE SAME

CROSS-REFERENCE TO RELATED APPLICATION

The present application claims priority to Korean Patent Application No. 10-2023-0027049, filed on Feb. 28, 2023, the entire contents of which is incorporated herein for all purposes by this reference.

BACKGROUND OF THE PRESENT DISCLOSURE

Field of the Present Disclosure

The present disclosure relates to a side sill bracket and a side sill assembly for a vehicle including the same, which enhance connectivity with a reinforcement member provided therein, improving stiffness against a side collision.

Description of Related Art

A side sill disposed on a lower side surface of a vehicle in a longitudinal direction of the vehicle serves as a structure of the lower side surface of the vehicle.

As shown in FIG. 1, upper portions and lower portions of a side sill internal 112 and a side sill outer 111 are joined by welding or the like, and a side sill member 113 is bonded to an internal side of the side sill internal 112. The side sill outer 111 is coupled to a lower end portion of a center pillar 120 extending downwardly from a roof of the vehicle.

Furthermore, to reinforce the stiffness of the side sill 110, a reinforcement member 114 manufactured by extrusion with aluminum is provided inside the side sill 110. The reinforcement member 114 is fastened to the side sill internal 112 with a fastening bolt or the like.

However, because the reinforcement member 114 is not fastened or connected to the side sill outer 111, there is a problem that in the event of a side collision, a lower portion of the center pillar 120 penetrates into an internal compartment of the vehicle, reducing a survival space of an occupant to be generated due to the collision.

Recently, the spread of electric vehicles and sports utility vehicles (SUVs) is expanding. In the electric vehicles, aerodynamic performance is improved by making a minimum ground clearance lower, and thus a position of the side sill 110 becomes lower. Meanwhile, as weights of the SUVs increase, there appears a phenomenon that an impact point in the event of the side collision is higher. As described above, as the side sill 110 becomes lower and the impact point of the side collision becomes higher, a side collision occurs at an upper portion of the side sill 110, and thus the lower portion of the center pillar 120 enters the internal compartment of the vehicle.

In other words, in a side collision test, by increasing a weight of a barrier B and increasing an impact point, as shown in FIG. 1, the barrier B and the side sill 110 do not overlap, and thus the side sill 110 may not effectively cope with the impact by the side collision.

Because the reinforcement member 114 and the side sill outer 111 are not directly fastened or connected, there is a problem that the reinforcement member 114 may not effectively resist a collision energy input by the side collision.

As the collision energy is input to the upper portion of the side sill 110, a rotation deformation of the side sill 110 occurs, which allows the lower portion of the center pillar 120 to enter the internal side of the compartment. This causes a phenomenon that the survival space of the occupant is reduced, resulting in increased injury to the occupant.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a side sill bracket and a side sill assembly for a vehicle including the same, which may support a portion between a side sill outer and a reinforcement member so that a collision energy input to the side sill outer is transmitted to the reinforcement member, improving side collision performance.

A side sill bracket according to an exemplary embodiment of the present disclosure may include an external bonding portion coupled to a side sill outer, an internal support portion formed stepwise with the external bonding portion, and a connection portion connecting the external bonding portion and the internal support portion, wherein the internal support portion is supported in contact with the reinforcement member fastened to the side sill internal connected to the side sill outer of the side sill assembly.

The connection portion may be connected to the external bonding portion and the internal support portion by a curved surface.

A portion of the connection portion connected to the external bonding portion and a portion of the connection portion conned to the internal support portion may be curved in opposite directions to each other.

In the connection portion, a curved surface of the connection portion connected to the external bonding portion and a curved surface of the connection portion connected to the internal support portion may be inflected.

A reinforcing portion having a predetermined depth from the internal support portion may be formed on the internal support portion.

The reinforcing portion may be connected to the internal support portion by a curved surface.

The external bonding portion may be coupled to an upper surface, an internal surface, and a lower surface of the side sill outer of the side sill assembly.

A foaming member may be attached among the external bonding portion, the internal support portion, the connection portion and the reinforcement member.

To form a gap with the reinforcement member, the foaming member may be attached to the external bonding portion, the internal support portion, and the connection portion and then foamed to fill the gap.

Meanwhile, a side sill assembly for a vehicle according to an exemplary embodiment of the present disclosure including a side sill inner, a side sill outer including an upper end portion and a lower end portion connected to the side sill inner, and a reinforcement member disposed between the side sill internal and the side sill outer in a longitudinal direction of the vehicle and fastened to the side sill internal may further include a side sill bracket mounted between the side sill outer and the reinforcement member and configured to support the side sill outer and the reinforcement member between the side sill outer and the reinforcement member.

The side sill bracket may be coupled to the side sill outer and provided in contact with an external surface of the reinforcement member.

The side sill bracket may include an external bonding portion coupled to the side sill outer, an internal support portion formed stepwise with the external bonding portion and in contact with the reinforcement member, and a connection portion connecting the external bonding portion and the internal support portion.

The connection portion may be connected to the external bonding portion and the internal support portion by a curved surface, and a portion of the connection portion connected to the external bonding portion and a portion of the connection portion conned to the internal support portion may be curved in opposite directions to each other.

A reinforcing portion having a predetermined depth from the internal support portion may be formed on the internal support portion.

The reinforcing portion may be connected to the internal support portion by a curved surface.

A foaming member may be attached to the internal support portion between the internal support portion and the reinforcement member.

A foaming member may be attached to the side sill bracket, and the foaming member is disposed between the side sill bracket and the reinforcement member, and to form a gap with the reinforcement member, the foaming member may be attached to the side sill bracket and then foamed to fill the gap between the side sill bracket and the reinforcement member.

The side sill bracket may be positioned under a portion of the side sill outer to which a center pillar of the vehicle is coupled.

The side sill bracket may be coupled to an internal surface and a lower surface of the side sill outer and fastened to an upper surface of the side sill outer of the side sill assembly.

A plurality of side sill brackets may be provided in plural at intervals in the longitudinal direction of the vehicle.

According to the side sill bracket and the side sill assembly for a vehicle including the same according to an exemplary embodiment of the present disclosure including the above configuration, by connecting the side sill outer and the reinforcement member through the side sill bracket so that collision energy is transmitted to the reinforcement member from the side sill outer in the event of the side collision, it is possible to prevent a rotation deformation of the side sill assembly.

In the event of the side collision, because the rotation deformation of the side sill assembly is prevented, it is possible to reduce the amount of the lower portion of the center pillar entering, the interior, sufficiently securing the survival space of the occupant and reducing the injury rate.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
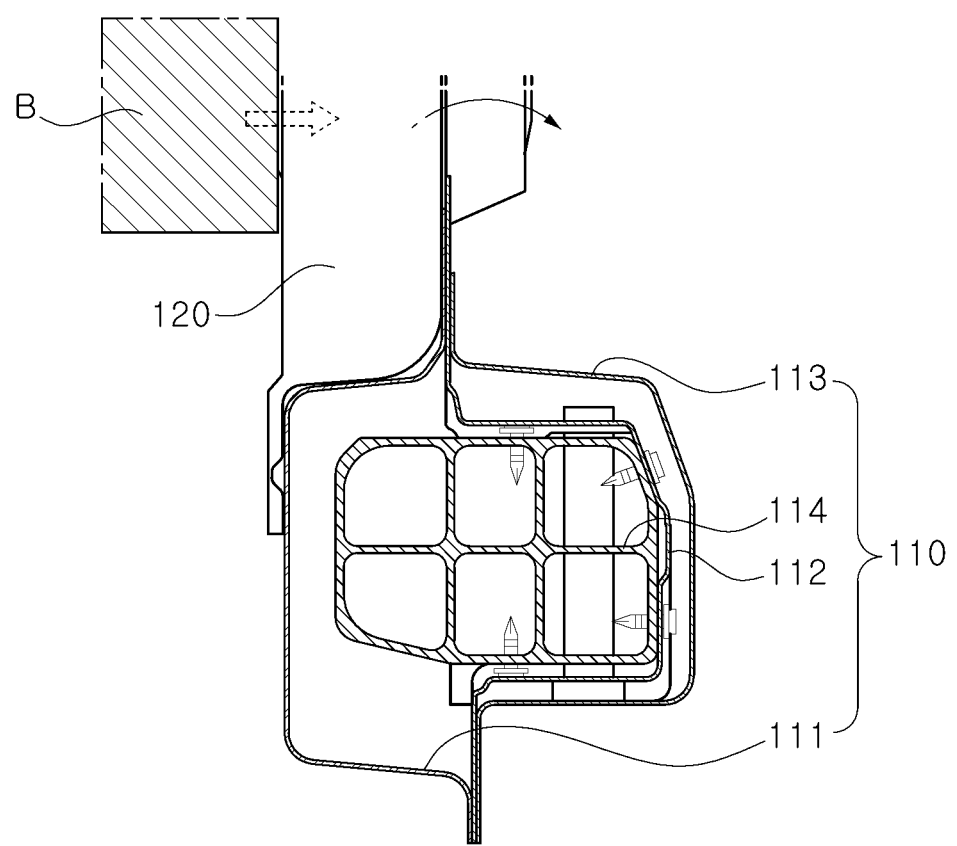
FIG. 1 is a cross-sectional view showing a side sill for a vehicle according to the related art.
Figure 2:
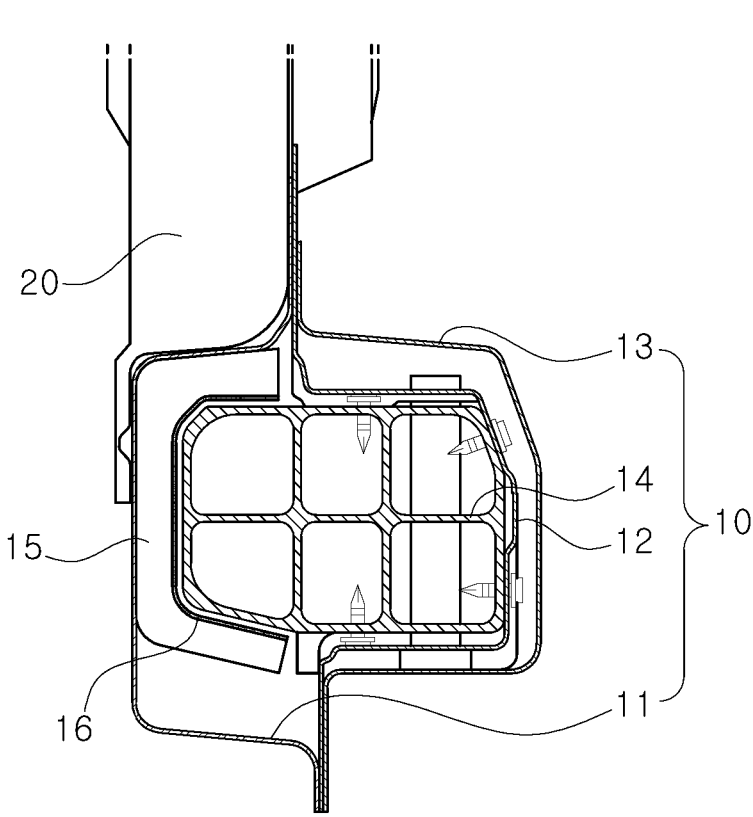
FIG. 2 is a cross-sectional view showing a side sill assembly for a vehicle according to an exemplary embodiment of the present disclosure.
Figure 3:
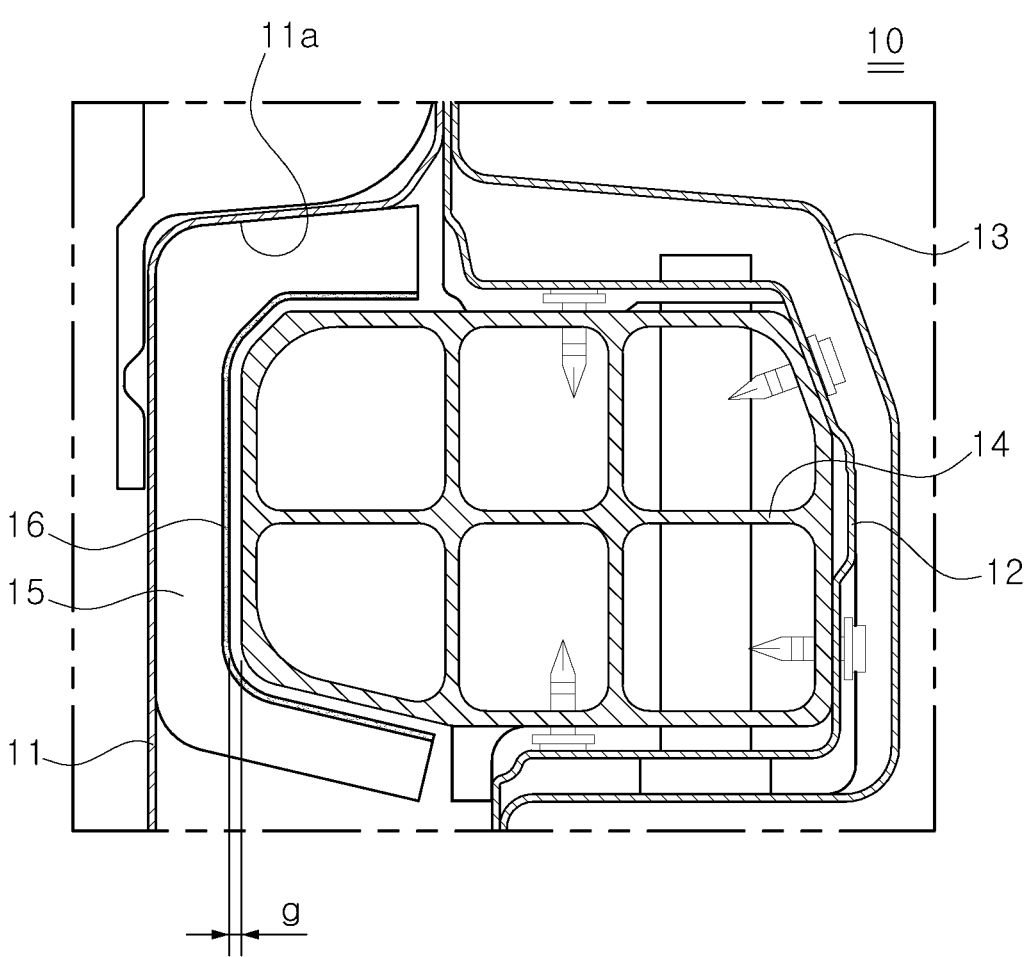
FIG. 3 is an enlarged cross-sectional view of main portions in FIG. 2.
Figure 4:
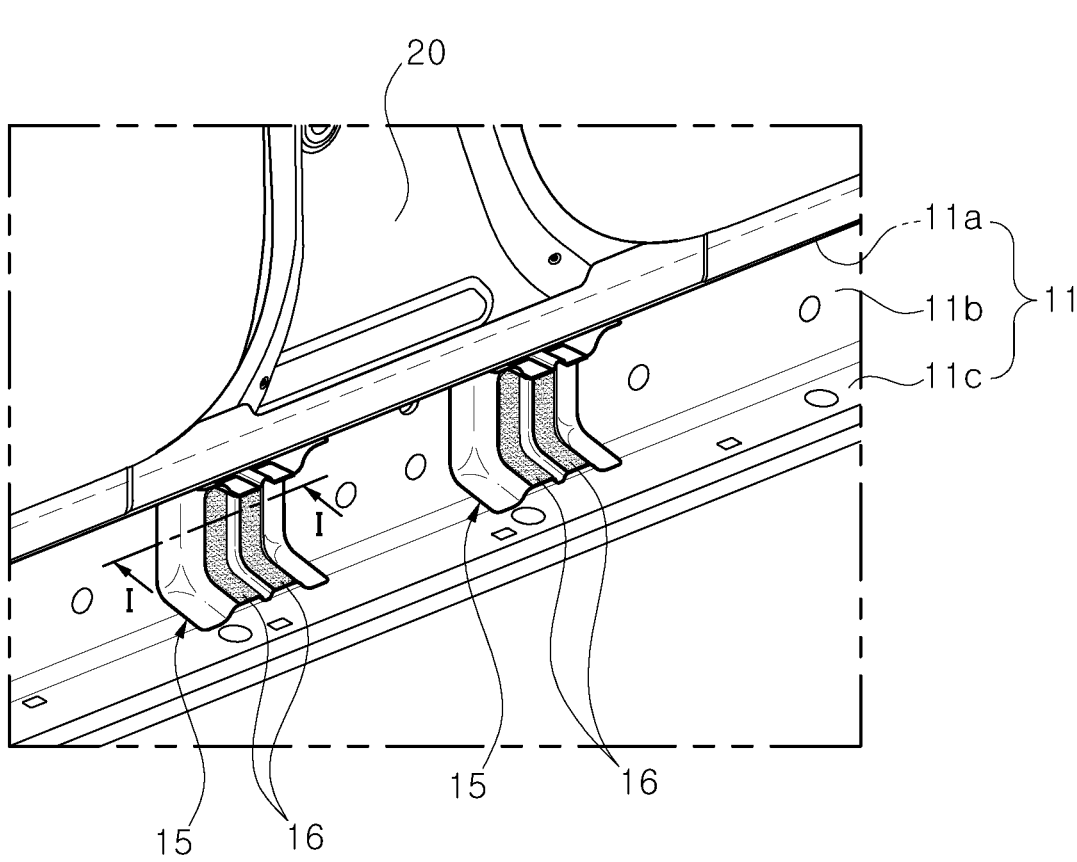
FIG. 4 is a perspective view showing a side sill assembly for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a side sill bracket and a side sill assembly for a vehicle including the same according to an exemplary embodiment of the present disclosure will be described in detail with reference to the accompanying drawings.

The side sill assembly for a vehicle according to an exemplary embodiment of the present disclosure including a side sill internal 12, a side sill outer 11 including an upper end portion and a lower end portion connected to the side sill internal 12, and a reinforcement member 14 disposed between the side sill internal 12 and the side sill outer 11 in a longitudinal direction of the vehicle and fastened to the side sill internal 12 may further include a side sill bracket 15 for supporting the side sill outer 11 and the reinforcement member 14 between the side sill outer 11 and the reinforcement member 14.

In the exemplary embodiment of the present invention, the term "connected" includes "bonded", "coupled" or "welded" but is not limited thereto.

In the side sill assembly 10, the upper end portions and the lower end portions of the side sill internal 12 and the side sill outer 11 may be coupled to each other, and middle portions of the side sill assembly 10 may be formed in a shape which is convex toward each of an inside and an outside of the vehicle to form a structure of a lower side surface of the vehicle.

The reinforcement member 14 for reinforcing the stiffness of the side sill assembly 10 may be provided between the side sill internal 12 and the side sill outer 11. For example, the reinforcement member 14 may be made of aluminum alloy and manufactured by extrusion.

The reinforcement member 14 may be fastened to the side sill internal 12 using a fastening bolt or the like.

The side sill member 13 may be provided to surround the side sill internal 12 therein.

The side sill bracket 15 may be provided to secure connectivity between the side sill outer 11 and the reinforcement member 14. That is, the side sill bracket 15 may fill a space between the side sill outer 11 and the reinforcement member 14 so that in the event of a side collision, collision energy input to the side sill outer 11 may be transmitted to the reinforcement member 14, and thus the reinforcement member 14 may resist the collision energy in the event of the side collision. Therefore, a rotation deformation of the side sill assembly 10 may be prevented, preventing a center pillar 20 coupled to a lower end portion of the side sill outer 11 from entering an internal compartment of the vehicle.

The side sill bracket 15 may be fastened to any one of the side sill outer 11 and the reinforcement member 14 and provided in contact with the other, and may be coupled to the side sill outer 11 and provided in contact with an external surface of the reinforcement member 14.

Describing a specific shape of the side sill bracket 15, the side sill bracket 15 may include an external bonding portion 15a in contact with the side sill outer 11, an internal support portion 15b formed stepwise with the external bonding portion 15a and in contact with the reinforcement member 14, and a connection portion 15c for connecting the external bonding portion 15a and the internal support portion 15b.

The external bonding portion 15a may be a portion in which the side sill bracket 15 is connected to the side sill outer 11. The external bonding portion 15a may be formed in a flange shape, and the external bonding portion 15a may be welded to form a weld W to the side sill outer 11 so that the side sill bracket 15 is coupled to the side sill outer 11.

The internal support portion 15b may be formed stepwise with the external bonding portion 15a. Since the side sill bracket 15 is in contact with the reinforcement member 14 in the event of the side collision of the vehicle, the internal support portion 15b may support the side sill bracket 15 and the side sill outer 11 by the reinforcement member 14.

The connection portion 15c may connect the external bonding portion 15a and the internal support portion 15b. The connection portion 15c may be connected to the external bonding portion 15a and the internal support portion 15b in a curved shape. In the instant case, a portion of the connection portion 15c connected to the external bonding portion 15a and a portion of the connection portion 15c connected to the internal support portion 15b may be connected in a form which is curved in opposite directions to each other. Therefore, in the connection portion 15c, a curved surface of the connection portion 15c connected to the external bonding portion 15a and a curved surface of the connection portion 15c connected to the internal support portion 15b may be inflected to form an inflection point in the middle. Meanwhile, a partial section of the connection portion 15c may be formed in a planar surface, and only portions of the connection portion 15c connected to the external bonding portion 15a and the internal support portion 15b may be formed in a curved surface.

Furthermore, a reinforcing portion 15d may be formed on the internal support portion 15b at a predetermined depth from the internal support portion 15b. Because the reinforcing portion 15d is formed on the internal support portion 15b in a height direction of the side sill bracket 15, the stiffness of the side sill bracket 15 may be improved.

The reinforcing portion 15d may be also connected to the internal support portion 15b by a curved surface. Furthermore, a middle portion of the reinforcing portion 15d may be formed in a planar shape parallel to the internal support portion 15b or the side sill outer 11.

Figure 5:
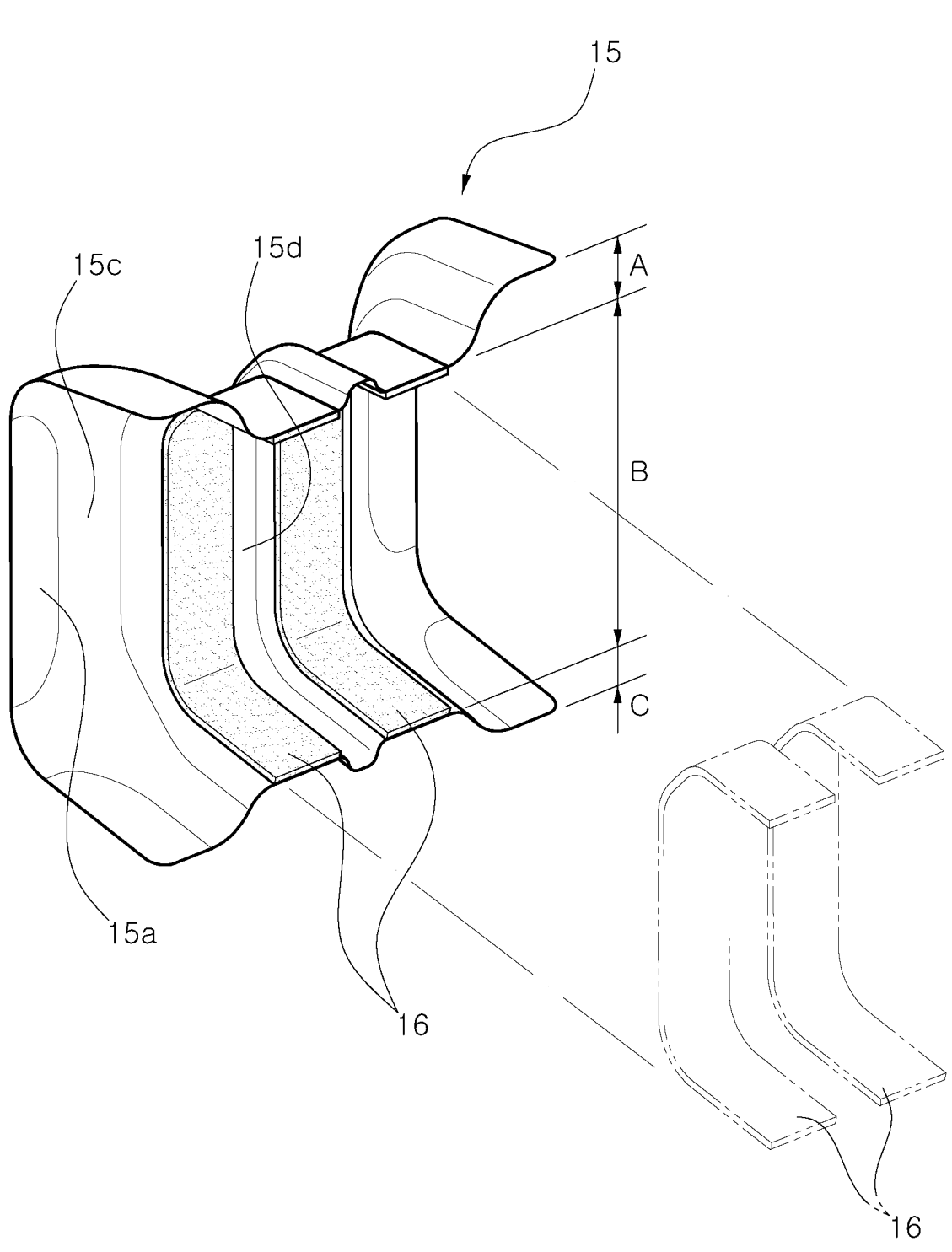
FIG. 5 is an enlarged perspective view showing a side sill bracket according to an exemplary embodiment of the present disclosure.
Figure 6:
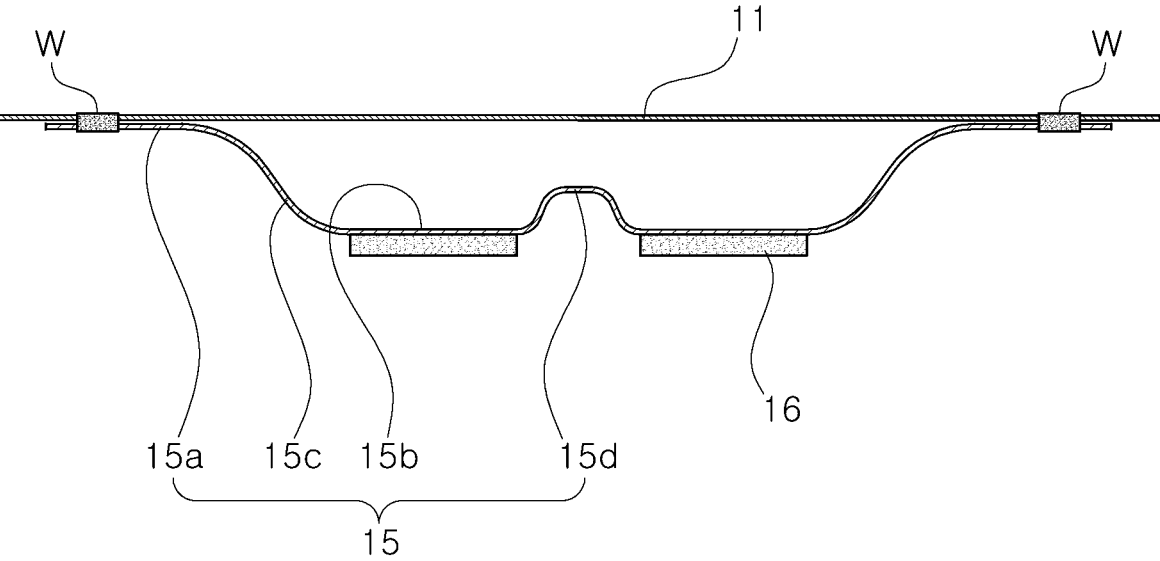
FIG. 6 is a cross-sectional view along line I-I in FIG. 4.

The side sill bracket 15 includes a substantially "C" shape when viewed from the front and rear of the vehicle in the longitudinal direction to be connected to an upper surface 11a, an internal surface 11b, and a lower surface 11c of the side sill outer 11. Therefore, an upper portion (region indicated by "A" in FIG. 5) of the side sill bracket 15 may be connected to the upper surface 11a of the side sill outer 11, a middle portion (region indicated by "B" in FIG. 5) may be connected to the internal surface 11b of the side sill outer 11, and a lower portion (region indicated by "C" in FIG. 5) may be connected to the lower surface 11c of the side sill outer 11.

The side sill bracket 15 may be manufactured through press processing of a metal plate.

A plurality of side sill brackets 15 may be provided and each coupled to the side sill outer 11 at intervals in the longitudinal direction of the vehicle.

The side sill brackets 15 may be coupled to the side sill outers 11 at intervals in the longitudinal direction of the vehicle under the portion of the side sill outer 11 to which the center pillar 20 is coupled.

When a barrier B or another vehicle in case of collision hits the upper portion of the side sill assembly 10, that is, the lower portion of the center pillar 20 in the event of the side collision, the side sill assembly 10 may be rotated by the collision energy. However, because the side sill bracket 15 is inserted between the side sill outer 11 and the reinforcement member 14 and connected thereto, the side sill outer 11 may be supported by the reinforcement member 14 through the side sill bracket 15 when the side sill outer 11 is deformed by the collision energy.

Therefore, because the rotation deformation of the side sill outer 11 partially occurs only in a small amount, the rotation deformation of the side sill assembly 10 may not substantially occur and the penetration of the center pillar 20 into the internal compartment of the vehicle may be remarkably reduced.

Because the penetration of the center pillar 20 into the internal is reduced, the survival space of the occupant may become larger, reducing the occupant's injury.

The side sill bracket 15 and the reinforcement member 14 may be connected through a foaming member 16 to fill a gap between the side sill bracket 15 and the reinforcement member 14.

The foaming member 16 may be formed in a tape shape and attached to a surface of the side sill bracket 15 facing the side sill internal 12. That is, the foaming member 16 may be attached to the internal support portion 15b of the side sill bracket 15.

When the foaming member 16 is attached to the side sill bracket 15, a gap g may be formed between the foaming member 16 and the reinforcement member 14. That is, the side sill bracket 15 may be attached to the side sill outer 11 in a state in which the foaming member 16 is attached thereto, and the side sill internal 12 may be coupled to the side sill outer 11 in a state of being fastened to the reinforcement member 14. In the instant case, the gap g may be formed between the foaming member 16 and the reinforcement member 14. The gap g is configured for easy loading when the side sill internal 12 and the side sill outer 11 are loaded to be coupled. When there is no gap g, the foaming member 16 and the reinforcement member 14 may be in contact with each other during loading of the side sill internal 12 and the side sill outer 11, causing interference therebetween. Therefore, the side sill internal 12 and the side sill outer 11 may be loaded in a state in which the gap g is formed between the foaming member 16 and the reinforcement member 14.

Meanwhile, after the side sill internal 12 and the side sill outer 11 are completely coupled, the foaming member 16 may be foamed in a painting process of the side sill assembly 10 to fill the gap g.

Figure 7:
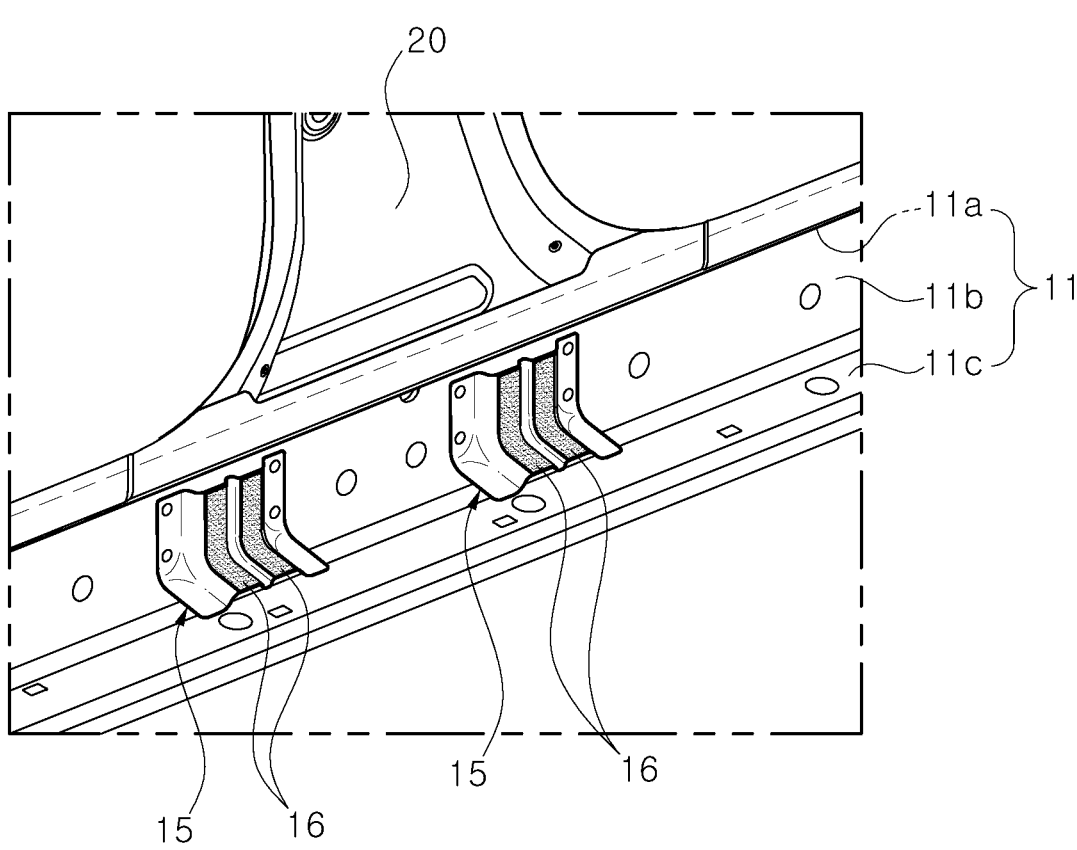
FIG. 7 is a perspective view showing a side sill assembly for a vehicle according to another exemplary embodiment of the present disclosure.
Figure 8:
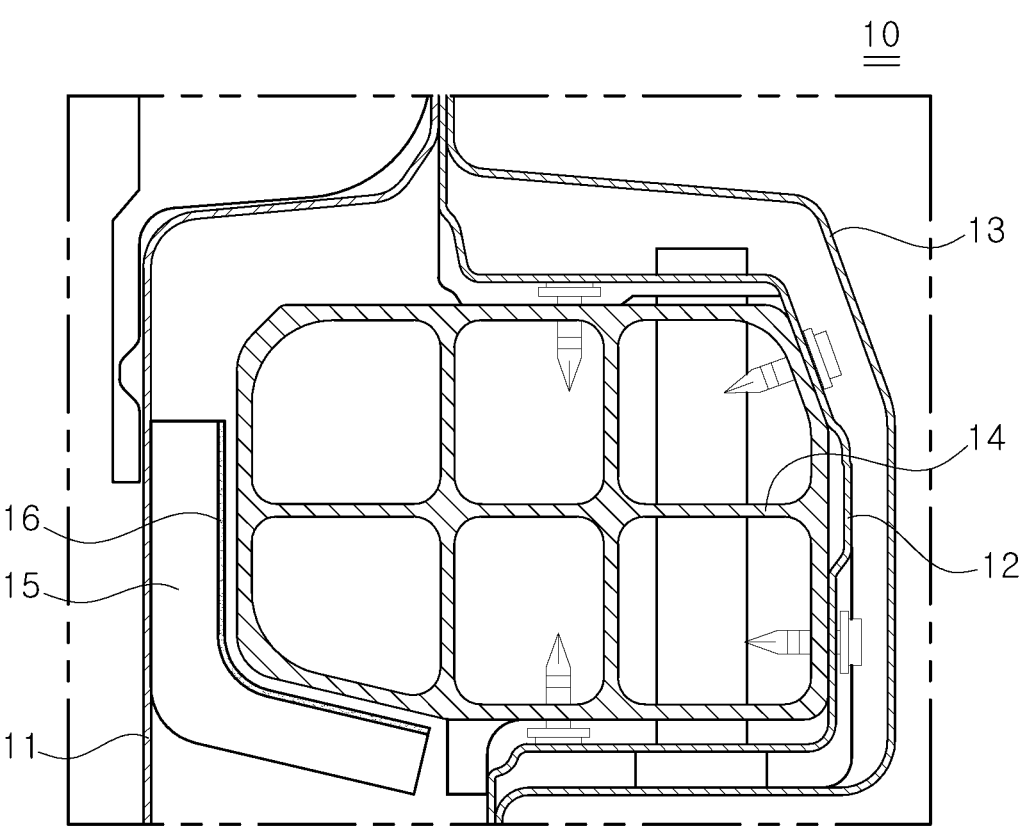
FIG. 8 is a cross-sectional view showing the side sill assembly for a vehicle according to another exemplary embodiment of the present disclosure as shown in FIG. 7.

FIG. 7 and FIG. 8 show a side sill assembly according to another exemplary embodiment of the present disclosure.

In the exemplary embodiment of the present disclosure, a part of the upper portion of the side sill bracket 15 may include a cut shape. That is, in the exemplary embodiment of the present disclosure, the side sill bracket 15 may include a shape in which the portion coupled to the upper surface of the side sill outer 11 is cut, and the remaining portion may be formed identically with the side sill bracket 15 as described above.

When the side sill bracket 15 in the above-described embodiment includes a "C" shape when viewed from the front and rear of the vehicle in the longitudinal direction, the side sill bracket 15 in the exemplary embodiment in FIG. 7 of the present disclosure may be formed in substantially an "L" shape.

Even when the upper portion of the side sill bracket 15 is cut, when the upper portion of the side sill assembly 10, that is, the lower portion of the center pillar 20 is hit in the event of the side collision, the rotation deformation of the side sill assembly 10 may occur. However, because the side sill brackets 15 are applied to the internal surface 11_b_ and the lower surface 11_c_ of the side sill outer 11, the reinforcement member 14 may support the internal surface 11_b_ and the lower surface 11_c_ of the side sill outer 11 through the side sill bracket 15, and thus the rotation deformation of the side sill assembly 10 may not occur.

Therefore, because the lower portion of the center pillar 20 is prevented from being deformed into the interior of the vehicle, it is possible to reduce the penetration amount of the lower portion of the center pillar 20 into the interior of the compartment, increasing the survival space of the occupants. Therefore, it is possible to reduce the occupant's injury.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A side sill bracket of a side sill assembly for a vehicle, the side sill bracket comprising:
   an external bonding portion configured to be coupled to a side sill outer of the side sill assembly;
   an internal support portion formed stepwise with the external bonding portion; and
   a connection portion connecting the external bonding portion and the internal support portion,
   wherein the internal support portion is supported in contact with a reinforcement member fastened to a side sill internal connected to the side sill outer of the side sill assembly, and
   wherein a foaming member is attached between the internal support portion and the reinforcement member.

2. The side sill bracket of claim 1, wherein the connection portion is connected to the external bonding portion and the internal support portion by a curved surface.

3. The side sill bracket of claim 2, wherein a portion of the connection portion connected to the external bonding portion and a portion of the connection portion connected to the internal support portion are curved in opposite directions to each other.

4. The side sill bracket of claim 2, wherein in the connection portion, a curved surface of the connection portion connected to the external bonding portion and a curved surface of the connection portion connected to the internal support portion are inflected.

5. The side sill bracket of claim 1, wherein a reinforcing portion having a predetermined depth from the internal support portion is formed on the internal support portion.

6. The side sill bracket of claim 5, wherein the reinforcing portion is connected to the internal support portion by a curved surface.

7. The side sill bracket of claim 1, wherein the external bonding portion is configured to be coupled to an upper surface, an internal surface, and a lower surface of the side sill outer of the side sill assembly.

8. The side sill bracket of claim 1, wherein to form a gap with the reinforcement member, the foaming member is attached to the external bonding portion, the internal support portion, and the connection portion and then foamed to fill the gap with the reinforcement member.

9. A side sill assembly for a vehicle, the side sill assembly comprising:

a side sill inner and a side sill outer including an upper end portion and a lower end portion connected to the side sill inner;

a reinforcement member disposed between a side sill internal and the side sill outer in a longitudinal direction of the vehicle and fastened to the side sill internal; and a side sill bracket mounted between the side sill outer and the reinforcement member and configured to support the side sill outer and the reinforcement member between the side sill outer and the reinforcement member, wherein a foaming member is attached to the side sill bracket, and the foaming member fills a gap between the side sill bracket and the reinforcement member, and wherein to form a gap with the reinforcement member, the foaming member is attached to the side sill bracket and then foamed to fill the gap between the side sill bracket and the reinforcement member.

10. The side sill assembly of claim 9, wherein the side sill bracket is coupled to one of the side sill outer and an external surface of the reinforcement member and provided in contact with another of the side sill outer and the external surface of the reinforcement member.

11. The side sill assembly of claim 9, wherein the side sill bracket includes:

an external bonding portion coupled to the side sill outer;

an internal support portion formed stepwise with the external bonding portion and in contact with the reinforcement member; and a connection portion connecting the external bonding portion and the internal support portion.

12. The side sill assembly of claim 11, wherein the connection portion is connected to the external bonding portion and the internal support portion by a curved surface, and wherein a portion of the connection portion connected to the external bonding portion and a portion of the connection portion conned to the internal support portion are curved in opposite directions to each other.

13. The side sill assembly of claim 11, wherein a reinforcing portion having a predetermined depth from the internal support portion is formed on the internal support portion.

14. The side sill assembly of claim 13, wherein the reinforcing portion is connected to the internal support portion by a curved surface.

15. The side sill assembly of claim 11, wherein a foaming member is attached to the internal support portion between the internal support portion and the reinforcement member.

16. The side sill assembly of claim 9, wherein the side sill bracket is positioned under a portion of the side sill outer to which a center pillar of the vehicle is coupled.

17. The side sill assembly of claim 9, wherein the side sill bracket is coupled to an internal surface and a lower surface of the side sill outer and fastened to an upper surface of the side sill outer of the side sill assembly.

18. The side sill assembly of claim 9, wherein a plurality of side sill brackets are provided at intervals in the longitudinal direction of the vehicle.

\* \* \* \* \*